(12) United States Patent
Kacines et al.

(10) Patent No.: US 12,740,648 B2
(45) Date of Patent: Sep. 22, 2026

(54) FURNITURE BENCH WITH HIDDEN PET RAMP

(71) Applicants: Jeffery J. Kacines, Allen, TX (US); Jonathan S. Kacines, Allen, TX (US)

(72) Inventors: Jeffery J. Kacines, Allen, TX (US); Jonathan S. Kacines, Allen, TX (US)

( * ) Notice: Subject to any disclaimer, the term of this patent is extended or adjusted under 35 U.S.C. 154(b) by 128 days.

(21) Appl. No.: 18/603,463

(22) Filed: Mar. 13, 2024

(65) Prior Publication Data

US 2024/0306822 A1 Sep. 19, 2024

Related U.S. Application Data

(60) Provisional application No. 63/451,682, filed on Mar. 13, 2023.

(51) Int. Cl.

| | |
|---|---|
| ***A47C 11/00*** | (2006.01) |
| ***A01K 1/035*** | (2006.01) |
| ***A47C 7/62*** | (2006.01) |

(52) U.S. Cl.

CPC .............. *A47C 11/00* (2013.01); *A01K 1/035* (2013.01); *A47C 7/626* (2018.08)

(58) Field of Classification Search

CPC .......... A47C 11/00; A47C 16/02; A47C 7/626

See application file for complete search history.

(56) References Cited

U.S. PATENT DOCUMENTS

| | | | | |
|---|---|---|---|---|
| 958,011 | A * | 5/1910 | Rothberg | B68G 7/05 29/91.5 |
| 3,150,032 | A * | 9/1964 | Rubenstein | B29C 70/086 52/223.13 |
| 3,173,398 | A | 3/1965 | Raymond | |
| 3,481,311 | A | 12/1969 | Schlutting | |
| 3,797,461 | A | 3/1974 | Breeden | |
| 4,846,304 | A | 7/1989 | Rasmussen | |
| 5,213,060 | A | 5/1993 | Sloan et al. | |
| 5,803,523 | A | 9/1998 | Clark | |
| 5,870,788 | A | 2/1999 | Witkin | |
| 6,119,634 | A | 9/2000 | Myrick | |
| 6,267,082 | B1 | 7/2001 | Naragon et al. | |
| 6,536,372 | B1 | 3/2003 | Loeser | |
| 6,732,676 | B1 | 5/2004 | Smith | |
| 6,928,959 | B1 * | 8/2005 | Trauernicht | B65G 69/287 119/847 |
| 7,011,045 | B1 | 3/2006 | Zehner | |

(Continued)

OTHER PUBLICATIONS

Internet page, Truck Ramp, author unknown, date unknown.

Internet page, Indoor Wooden Pet Ramp, author unknown, date unknown.

*Primary Examiner* — Ashesh Dangol

(74) *Attorney, Agent, or Firm* — Roger N. Chauza, PC

(57) ABSTRACT

A piece of household furniture in the form of a bench seat that is equipped with a pet ramp. The pet ramp is stored under a cushion portion of the household furniture and hidden from view until deployed so that a pet can ascend the ramp to the cushion and therefrom to a bed. The pet ramp is slideable from the hidden position and extended from the side of the bench seat to form an incline. A pet can thus move from the floor to the cushion via the inclined ramp, and from the cushion to the bed. When the pet ramp is not in use and stowed to the hidden position, the bench seat appears as a typical piece of furniture.

16 Claims, 5 Drawing Sheets

(56) References Cited

U.S. PATENT DOCUMENTS

| | | | | |
|---|---|---|---|---|
| 7,128,357 | B1 * | 10/2006 | Carroll | B60P 1/431<br>296/61 |
| 7,302,725 | B2 | 12/2007 | Thygesen | |
| 7,621,236 | B2 | 11/2009 | Steffey et al. | |
| 7,878,150 | B2 | 2/2011 | Dietz | |
| 8,117,994 | B1 | 2/2012 | Goodlow | |
| 8,978,177 | B1 | 3/2015 | Peele | |
| D734,570 | S | 7/2015 | Hawk | |
| D736,484 | S | 8/2015 | Jakubowski et al. | |
| 9,856,654 | B1 | 1/2018 | Tagart et al. | |
| 11,540,486 | B2 | 1/2023 | Weber et al. | |
| 11,585,096 | B2 | 2/2023 | Jakubowski | |
| 2005/0115522 | A1 | 6/2005 | Bishop | |
| 2006/0150346 | A1 | 7/2006 | Myrick et al. | |
| 2007/0006816 | A1 | 1/2007 | Dietz | |
| 2007/0163510 | A1 | 7/2007 | Dietz | |
| 2008/0072827 | A1 * | 3/2008 | Bohjalian | A01K 5/0114<br>119/28.5 |
| 2011/0303126 | A1 * | 12/2011 | Martenson | A47G 9/00<br>108/42 |
| 2014/0123910 | A1 | 5/2014 | Rorke et al. | |
| 2016/0095441 | A1 * | 4/2016 | Simitian | A47C 3/00<br>297/452.18 |
| 2016/0144759 | A1 | 5/2016 | DiBlasio et al. | |
| 2017/0355294 | A1 * | 12/2017 | Bisson | B60P 1/52 |
| 2018/0105091 | A1 | 4/2018 | Stevens | |
| 2018/0228121 | A1 | 8/2018 | Murray | |
| 2020/0060224 | A1 | 2/2020 | Volin | |
| 2021/0146842 | A1 | 5/2021 | Niemela et al. | |

* cited by examiner

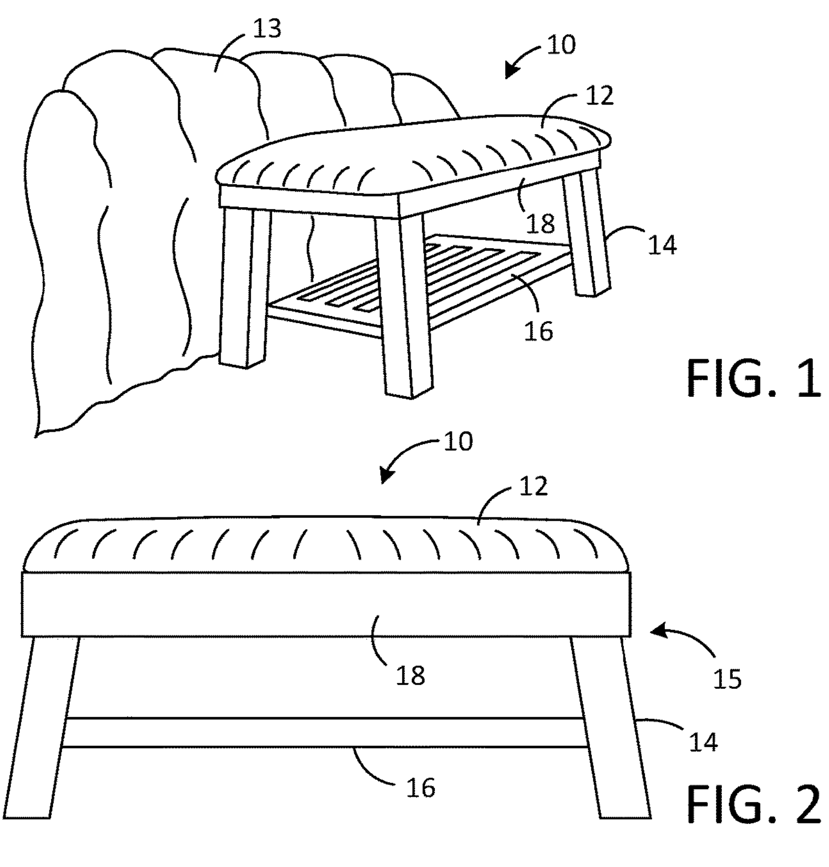
FIG. 1
FIG. 2
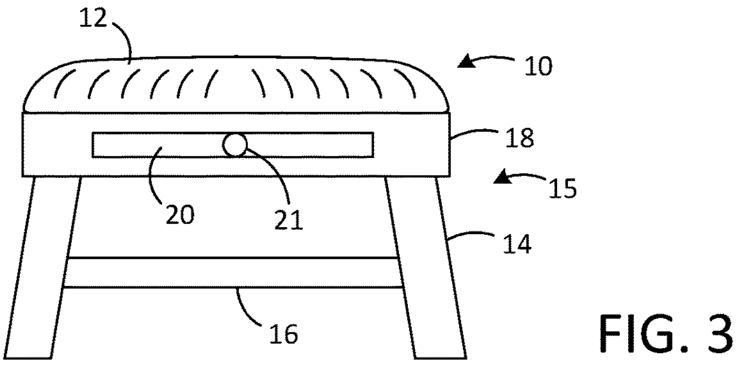
FIG. 3
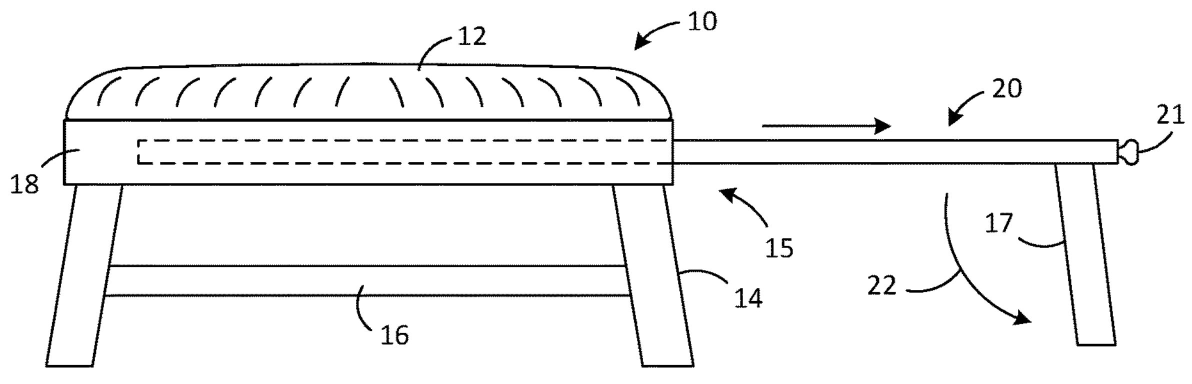
FIG. 4

FURNITURE BENCH WITH HIDDEN PET RAMP

TECHNICAL FIELD OF THE INVENTION

The present invention relates in general to furniture and pet ramps, and more particularly to methods and apparatus for integrating a pet ramp into household furniture so that when not deployed, the pet ramp is hidden from view.

BACKGROUND OF THE INVENTION

Pet ramps are routinely available to enable pets to more easily negotiate their movement from the floor to a bed or couch, and vice versa. Some furniture is simply too high for small pets to jump thereon from the floor. Pet ramps are especially useful for older pets who have joint ailments and find that the movement of their bodies or jumping is stressful and painful. To that end, pet ramps of various types are available to assist pet movement between household furniture or vehicles and the floor or ground, as well as in other situations.

Most pet ramps that are known in the industry are constructed of sturdy metal, plastic or wood and have the look or appearance of industrial or mechanical apparatus. Many of the pet ramps available are designed and constructed for a single purpose, i.e., an inclined ramp that serves a single purpose, namely to assist a pet in moving from the floor or ground to an elevated platform. As such, these types of pet ramps often include a ramp and at the upper end thereof a platform is formed. While this type of pet ramp functions for its desired purpose, it is often not aesthetically pleasing, and so much so that they are not often desired for use in a home along with other household furniture.

The prior art includes a few attempts to simulate pet ramp structures as furniture. For example, in U.S. Pat. No. 3,797,461, a pet house is disclosed. The pet house is constructed with wood that looks like furniture and has facilities for housing a pet, but nevertheless serves a single purpose for a pet and cannot also serve as furniture that one can sit on. A dual use structure is not available which is functional for pet use as well as human use. Further, the ramp disclosed in this patent is either part of a top or side of the pet house, and is moved about a hinged edge to either close a top or side opening of the pet house. As such, the pet ramp is always visible and cannot be hidden so that the remainder of the structure appears as typical household furniture. It is well known that household furniture does not normally include ramp apparatus.

U.S. Pat. No. 8,978,177 describes a person's bed equipped with a pet ramp formed at the foot of the bed. While this affords an easy path for pets to gain access to the top of the bed, the pet ramp remains visible and cannot be hidden from view. This patent describes the pet ramp as being hidden, as the foot board hides the pet ramp from the frontal side thereof, but the top and end of the pet ramp apparatus is still visible. The bed cannot function as a bed alone without the pet ramp located alongside the bed. Thus, the bed constitutes a furniture piece, but always appears together with the visible pet ramp.

Many other pet ramp structures are known in the prior art. U.S. Published patent application 2020/0060224 describes a stand-alone pet crate that is collapsible, and includes a ramp. Other pet ramps are described in the following patents: U.S. Pat. Nos. D736,484; D734,570; 6,732,676; 7,621,236; 8,117,994; 2014/0123910; 22016/0144759 and 2021/0146842.

SUMMARY OF THE INVENTION

In accordance with the principles and concepts of the invention, disclosed is a piece of household furniture constructed as a bench seat used for sitting on, and with a pet ramp integrated therein. Thus, when the pet ramp is not deployed, the bench seat appears as a conventional piece of household furniture as the pet ramp is hidden from view. When the pet ramp is extended and inclined from the bench seat, a pet can easily move between the floor and a bed, or other furniture, depending on where the user chooses to place the bench seat. Even when the pet ramp is deployed, the household furniture can still be used by a person.

According to an embodiment of the invention, disclosed is a bench seat that includes an upholstered cushion and finished wood components that include a cushion support, legs, a pet ramp and a magazine rack, all finished with a decorative stain. Thus, the bench seat appears as a common piece of household furniture. A user can sit on the bench seat, and when the ramp is deployed, a pet can negotiate the pet ramp.

A feature of the bench seat of the invention is that it is portable and can be moved adjacent to other pieces of furniture. For example, the bench seat of the invention can be moved and positioned adjacent a bed in order for the pet to move from the floor to the bed. Similarly, the bench seat of the invention can be moved adjacent to a couch or chair so that a pet can negotiate movement between a floor and the couch or chair.

With regard to a feature of the invention, the bench seat includes opposed slotted rails into which pegs of the pet ramp are inserted to provide a sliding arrangement to allow the pet ramp to move into the bench seat to a hidden position under the cushion. The slotted arrangement also allows the pet ramp to be pulled outwardly and pivoted at its inner end to provide an inclined ramp allowing the pet to easily move onto or off the cushion. The only portion of the pet ramp that is visible when hidden under the cushion is the vertical edge of the outer end, to which a handle is fastened. The handle is employed to grasp and pull the pet ramp from the hidden position to an extended and inclined position, and vice versa.

According to a feature of the invention, the slotted arrangement includes a downwardly depending depression or cutout at the outer end of the slot, thus allowing the ramp pegs to drop therein when the pet ramp is deployed outwardly. The pegs resting in the depression prevent the pet ramp from being inadvertently pushed back into the bench seat. The inner end of the pet ramp must be raised slightly to remove the pegs from the respective depressions and allow the pegs to be moved along the slots into the bench seat.

A further feature of the invention includes a pet ramp equipped with a pair of pivotal legs to allow the pet ramp to remain horizontal and parallel with the cushion of the bench seat. The legs are pivotally mounted to the outer part of the pet ramp to support that end of the ramp. The ramp is thus supported in a horizontal position at one end thereof by two legs of the bench seat, and at the opposite outer end thereof by the two pivotal legs. When it is desired to utilize the pet ramp as an inclined structure, the pivotal legs are simply rotated up against the underside of the pet ramp, whereby the outer end of the pet ramp can be lowered to the floor to provide an incline.

Yet another feature of the invention is the pet ramp which can function as a shoe rack in the bench seat, or moved from that position to the end of the bench seat to function as an inclined ramp. The one end of the pet ramp according to this embodiment includes a pair of inverted U-shaped saddles for resting on a cross bar to support the upper inclined end of the ramp. Similarly, when the pet ramp functions as a shoe rack under the bench seat, the pair of inverted U-shaped saddles rest on a cross piece located between two legs of the bench seat. This allows the pet ramp to remain supported in a horizontal position under the cushion of the bench seat.

An aspect of the invention is that a cushioned bench seat is constructed as a common piece of household furniture, with a magazine rack located under the cushion. The magazine rack is removably attached to four legs of the bench seat and can be removed therefrom and placed under an end of the cushion to function as a pet ramp. When the rack is not employed as a ramp, the bench seat otherwise appears as a typical piece of household furniture.

According to an embodiment of the invention, disclosed is an item of household furniture that includes a bench seat that has four legs and a cushion support supported by the legs. Also included is a cushion that is supported by the cushion support, and the cushion is for sitting on by a user thereof. A ramp is extendable from a hidden position under the bench seat to a position extended from one side of the bench seat, and the ramp has a top surface on which a pet can move. The ramp is pivotally mounted at one side thereof to the household furniture so that when the ramp is pivoted downwardly until an opposite side of the ramp engages with a floor, the ramp provides an inclined surface. When the top surface of the ramp is hidden under the bench seat, the bench seat appears as conventional household furniture.

According to another embodiment of the invention, disclosed is an item of household furniture which includes an upholstered seat covered with a fabric including one of cloth, vinyl or leather. The seat support is constructed of wood for supporting an outer periphery of the upholstered seat, and the wood seat support has four sides, each of the seat support sides is stained a suitable color to provide a furniture appearance. Further included are four wooden legs supporting the wood seat support, and the four wooden legs are stained to match the stain of the wood seat support. A pet ramp is constructed of wood and stained with the suitable color to match that of the wood seat support and the wood legs. The pet ramp is slideable horizontally from a position under the upholstered seat and generally hidden from view, to a position extended from one side of the wood seat support. The pet ramp is pivotally mounted to the wood seat support so that an outer end thereof can be pivoted downwardly and rest on a floor, whereby the pet ramp is inclined with respect to the wood seat support.

According to another embodiment of the invention, disclosed is an item of household furniture, where the item includes a bench seat that includes four legs and a cushion support supported thereunder by the legs. Further included is a cushion that is supported by the cushion support, where the cushion is for sitting on by a user thereof. A first rod extends between two legs of the four legs, and a second rod extends between two other legs of the four legs. Included is a rack that is suitable for holding household things thereon, and the rack is located under the cushion and at a vertical location so that the household things can be easily accessed from a top surface of the rack. The rack has a first end and an opposite second end, with the first end resting on the first rod and the opposite second end of the rack having attached thereto a pair of inverted U-shaped saddles. The pair of inverted U-shaped saddles engage with the second rod to support the second end of the rack on the second rod. A third rod extends between a top of two legs of the four legs, and the rack can be moved from under the cushion so that the inverted U-shaped saddles are rested on the third rod when the first end of the rack rests on a floor, whereby the rack functions as a ramp so that a pet can move from a floor to the cushion of the bench seat. When the ramp is disguised as a rack, the bench seat appears as conventional household furniture.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 1 is an isometric view of a furniture bench seat constructed according to the invention;

FIG. 2 is a side view of a simplified bench seat of FIG. 1 with the pet ramp hidden from view;

FIG. 3 is a frontal end view of the furniture bench seat, illustrating the front end of the pet ramp and the knob attached thereto;

FIG. 4 is a side view of the simplified bench of FIG. 2, with the pet ramp deployed outwardly from the bench and parallel to the seat cushion;

FIG. **7*a* is an end view of the ramp showing opposing pegs.

DETAILED DESCRIPTION OF THE INVENTION

Figure 5:
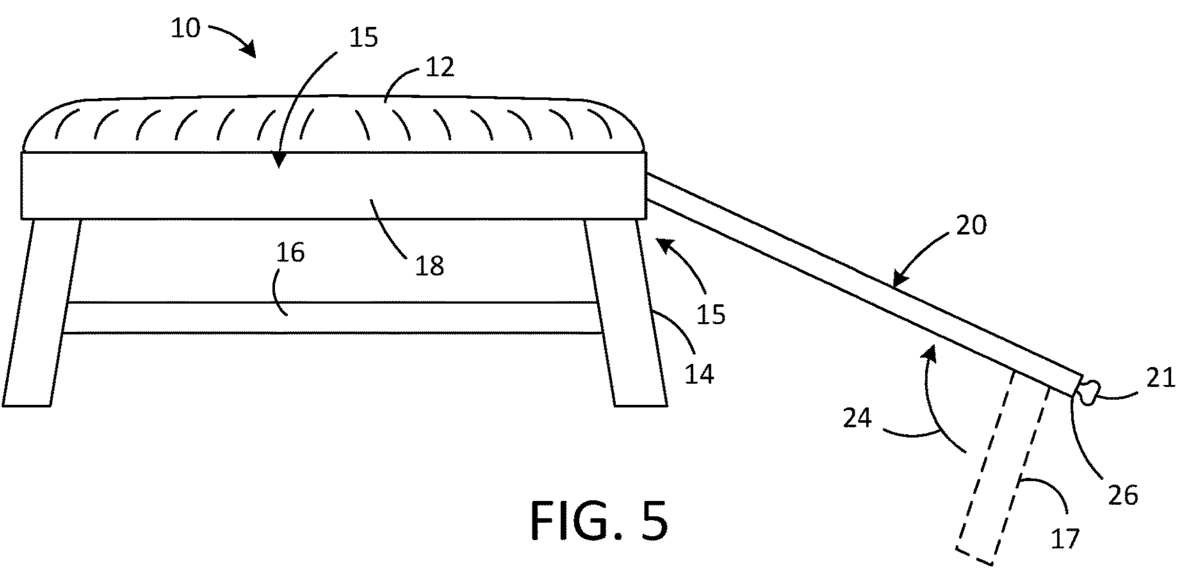
FIG. 5 is a side view of the bench of FIG. 4, with the legs of the pet ramp folded under the ramp so that the ramp is inclined.

FIGS. 1-5 of the drawings illustrate various features of an embodiment of the invention. FIG. 1 is an isometric side view of a piece of household furniture with the pet ramp hidden from view. The bench seat 10 of the household furniture is illustrated at the foot of a bed 13. In this configuration, the household furniture appears as a conventional or ordinary padded bench seat 10. FIGS. 3-5 illustrate various features of the pet ramp 20. When the pet ramp 20 is not used, the cushion, cushion support and legs resemble a typical piece of furniture that can be situated at the foot of a bed 13, in front of a couch, etc. FIG. 2 is a simplified illustration of the furniture shown in FIG. 1. A primary purpose of the household furniture of the invention is to provide a piece of furniture, as well as to convert the furniture to a pet ramp to facilitate the movement of pets onto furniture from the floor, and vice versa. The bench seat 10 has a seat cushion 12 that is preferably upholstered. The upholstery can include a padding or stuffing covered with leather, vinyl, fabric or other materials well known in the furniture art. Alternatively, the furniture bench seat 10 can be covered with a pet bedding so that the pet can rest at an elevated position above the floor.

According to an embodiment of the invention, the bench seat 10 is rectangular as viewed from the top, and is approximately 10.0 inches by 42.0 inches. The distance between the top of the cushion and the floor is about 18.0 inches. The ramp 20 is also rectangular with dimensions of about 16.0 inches by 41.5 inches. The ramp 20 is about 1.125 inches thick. These dimensions correspond to a bench seat 10 of one embodiment, it being realized that those skilled in the art may desire a bench seat with many different dimensions.

The bench seat 10 according to an embodiment of the invention includes four legs, one illustrated with numeral 14. While the legs 14 are illustrates as being of a straight design, the legs 14 could also be constructed with other known designs, such as French, English, Swedish, antique, etc. The bench seat 10 includes a cushion support 18 that circumscribes the seat cushion 12 and supports the seat cushion 12 on the legs 14. The cushion support 18 and the legs 14 constitute a frame 15 of the bench 10. The cushion support 18 is preferably rectangular in shape to thereby match the shape of the upholstered seat cushion 12. The frame 15 can be constructed of a wood material and stained, painted or otherwise coated with a decorative material typical of household furniture. If a magazine rack 16 is desired, it can be stained with a similar finish. The seat cushion 12 includes a rigid base and is either laid on the cushion support 18, or is fastened thereto by conventional fasteners. In the preferred embodiment, the bench seat 10 includes a pet ramp 20 located under the seat cushion 12 when the ramp 20 is not used. When the pet ramp 20 is deployed, it allows easy use for pets to move from the floor to the bed 13. The pet ramp 20 is equipped with a handle or drawer pull 21 to grasp and either pull the pet ramp 20 out from under the bench seat 10, or push it back to the hidden position. The pet ramp 20 is rectangular, as is the seat cushion 12, and is preferably constructed of the same material as the parts or components of the frame 15.

With the construction of the furniture bench seat 10 described above, it can be used in the den, office, bedroom, or any other room of a household. The bench seat 10 is constructed so that it can be used as a foot stool or a step to stand on to generally reach items out of reach. It is contemplated that the bench seat 10 can be situated beside a bed, couch or chair so that an animal can either jump on the bench seat 10, or utilize the inclined ramp 20 to be described in detail below. To that end, the legs 14 of the bench seat 10 can be of a length so that the top cushion 12 is about half as high as the bed, chair or couch. The height of the bench seat 10 can be adjusted by utilizing adjustable height legs 14 (not shown), if desired. Those skilled in the art can easily design decorative legs 14 of adjustable height. In the preferred embodiment, the bench seat 10 is equipped with a rack 16 to hold magazines, shoes or other articles. The magazine rack 16 is supported between the four legs 14 of the bench seat 10, and is constructed with slats of wood in a decorative furniture manner. The magazine rack 16 can be constructed of the same material as the frame 15, and coated with the same coating as the other components of the bench seat 10.

The pet ramp 20 of the bench seat 10 is illustrated in FIGS. 3-5, it being understood that the shape of the pet ramp 20 matches the shape of the frame 15, i.e., preferably a rectangular shape. The pet ramp 20 is constructed so as to be deployed in three stable orientations. The first orientation is where the pet ramp 20 is stowed under the seat cushion 12, as illustrated in FIG. 3. The pet ramp 20 can be pulled out from its hidden position under the seat cushion 12 using a knob or handle 21. As can be appreciated, the frontal end edge of the pet ramp 20 appears in FIG. 3 as a drawer or shelf that is customary with bench seats.

In the second orientation illustrated in FIG. 4, the pet ramp 20 is pulled out horizontally from its hidden position to a position where it is substantially parallel with the seat cushion 12. As will be described in detail below, in order to deploy the pet ramp 20, it is pulled outwardly until stopped by an internal stop. In the horizontal orientation, the pet ramp 20 is effectively an extension of the seat cushion 12, albeit somewhat lower than the seat cushion 12, and can be used to rest one's feet on, or can be a platform for a pet to sit or lie on. The user can thus use the seat cushion 12 to rest his/her legs on, while the pet lies on the extended horizontal ramp 20. A cushion can be laid on the extended ramp 20 so that the pet can rest thereon, or jump therefrom to a couch, chair, bed, etc. The pet ramp 20 includes a pair of feet or legs, one shown as numeral 17. If it is desired to maintain the pet ramp 20 in the horizontal orientation, the legs 17 are foldable from a position under the ramp 20, to a position generally perpendicular to the ramp 20. The ramp legs 17 are rotated to the perpendicular position illustrated in FIG. 4 according to the arrow 22. The two ramp legs 17 can be attached to the outer end of the pet ramp 20 using screws, pegs or the like (not shown). As an alternative, the ramp legs 17 can be fastened to the outer part of the pet ramp 20 using lockable mechanisms that are similar to those used on portable tables, card tables and the like. Other locking mechanisms can be employed, such as a peg inserted through aligned holes in the ramp legs 17 and the respective side rails of the ramp 20. With this arrangement, the ramp legs 17 can be locked when rotated downwardly so that they do not inadvertently collapse when weight is placed on the pet ramp 20. As noted above, the pet ramp 20 is preferably constructed with the same material as the bench frame 15, and coated with the same decorative material.

In the third orientation illustrated in FIG. 5, the legs 17 of the pet ramp 20 are rotated in the direction of arrow 24 to a location back under the ramp 20 in the hidden position. Magnets or other locking apparatus can be employed on both the side rails of the ramp 20 and the ramp legs 15 to maintain the legs 17 folded upwardly. If one desires to proceed from the first orientation of FIG. 2 to the third orientation of FIG. 5, then the ramp legs 17 can remain folded under the outer end of the pet ramp 20. In order to move the pet ramp 20 from the horizontal position to an inclined position, the inner edge of the pet ramp 20 can then be rotated or pivoted at the bench seat 10 so that the outer end edge 26 of the pet ramp 20 rests on the floor and the outer end is angled upwardly toward the seat cushion 12 of the bench seat 10. The third orientation enables the pet to easily move from the floor to the seat cushion 12 of the bench seat 10. In the inclined orientation, the outer end 26 of the ramp 20 rests on the floor so that the ramp 20 is inclined upwardly toward the bench 10. The bench seat 12 can also be constructed without the two ramp legs 15 so that the ramp 20 only functions as an inclined surface to facilitate the movement of pets on and off the bench seat 12.

The top surface of the pet ramp 20 can be covered with a fabric or other type of upholstery covering. As an alternative, the top surface of the pet ramp 20 can be covered with a non-skid material that can be adhered to the top surface thereof to prevent the pet from slipping or scratching the top surface of the ramp 20. As noted above, it is contemplated that the bench/ramp will be used beside couches, beds, chairs, etc., so that pets can more easily climb onto furniture, as well as return to the floor.

Figure 6:
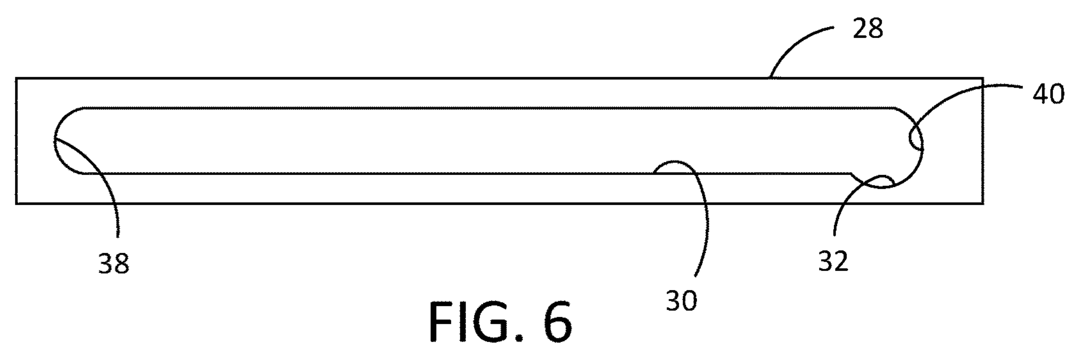
FIG. 6 is a side view of a slotted rail that facilitates movement of the ramp into and out of the bench seat.
Figure 7A:
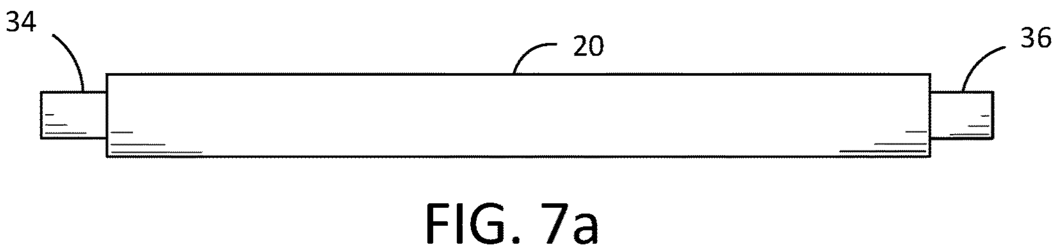
FIG. 7*b* is a side view of an end of the ramp showing one of the pegs.
Figure 7B:
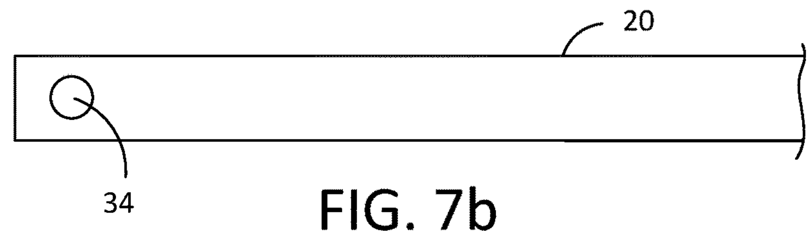

In order to move the pet ramp 20 from the inclined position (FIG. 5) back to the hidden position (FIG. 3), one can simply rotate the outer end 26 of the pet ramp 20 upwardly to a horizontal position, fold the legs 17 back under the ramp 20 (if they are deployed downwardly), and push the ramp 20 into the bench seat 10 via the pegs 34 and 36 (FIGS. 6-8) and respective slotted rails 30 until stopped by rail stops 38.

Figure 8:
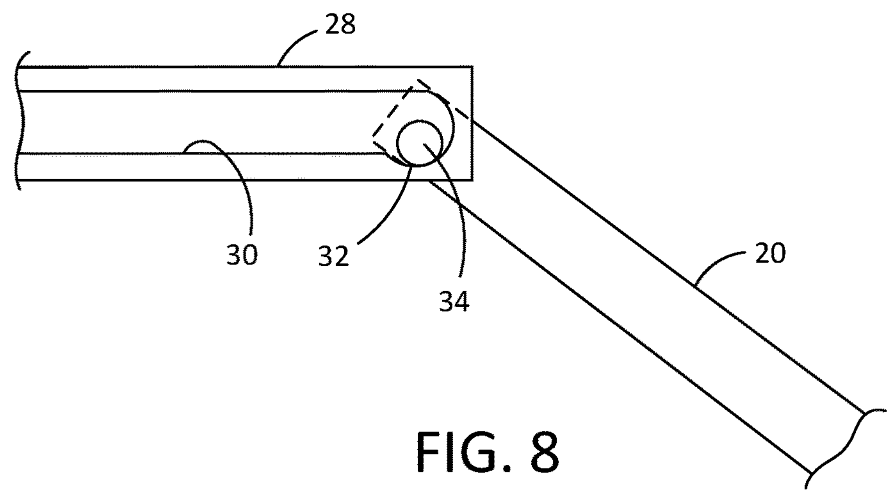
FIG. 8** is a side view of the slotted rail with a peg of the ramp engaged within a depression of the slot.

As noted above, the pet ramp 20 can slide in and out of the bench seat 10. This is accomplished with the slide arrangement illustrated in FIGS. 6-8. Here, the arrangement includes an elongated slotted side rail 28 that has an elongated slot 30 formed therein. The slotted rail 28 can be attached to or formed in one side of the cushion support 18. The slot 30 need not be formed entirely through the width of the side rail 28 so that both the slot 30 and the ramp pegs 34 and 36 (FIG. 7*a*) remain hidden. The slot 30 is preferably closed at each end, with the outer end of the slot 30 having a semi-circular cutout 32 extending downwardly. The slot 30 is constructed to receive therein the peg 34 of the pet ramp 20 so that the peg 34 can freely slide horizontally within the elongated slot 30. As illustrated in FIG. 8, the cutout 32 is for receiving at least a portion of the peg 34 downwardly therein to provide a stop so that the deployed ramp 20 cannot be inadvertently moved back inwardly into the bench seat 10. For ease of assembly, one or both of the pet ramp pegs 34 and 36 can be spring loaded for insertion into the respective slots 30. Further, those skilled in the art may prefer to attach the slotted rails 28 to the pet ramp 20 and the pegs 34 and 36 to the opposed components of the cushion support 18.

A similarly-constructed slotted rail 28 is situated on the opposite side of the bench seat 10 to accommodate the other ramp peg 36 therein. Those skilled in the art may find it useful to allow the pet ramp 20 to be entirely removed from the slotted rails 28. This can be accomplished by removing the outer stop 40 and extending the slot to the end of the rail 28. With this arrangement, the pet ramp 20 can be moved outwardly from under the bench seat 10 and entirely out of the furniture. It is understood that the pet ramp 20, the ramp legs 15 and the slide structure 28 are constructed with sturdy materials so that a person can sit or stand on the pet ramp 20 when functioning as a horizontal platform (FIG. 4).

One or both of the ramp pegs 34 and 36 can be fastened to the respective sides of the ramp 20 by screws, by glue or other suitable means. As noted above, one or both of the pegs 34 or 36 can be spring loaded for easy insertion into the slots 30. The vertical height of the slot 30 can be about one-half inch, and the diameter of the peg 34 can be somewhat smaller than the vertical height of the slot 30. FIG. 8 illustrates the ramp peg 34 engaged within the cutout 32 when the ramp 20 is fully extended and the outer end 26 is resting on the floor. As can be appreciated, the pet ramp 20 cannot be moved too far into the bench seat 10 via the slot 30, as the end 38 of the slot 30 functions as a first stop and prevents further inwardly movement of the pet ramp 20. Similarly, the opposite outer end 40 of the slot 30 functions as a second stop to prevent further outward movement of the pet ramp 20 from the bench seat 10. Accordingly, in this embodiment, the ramp 20 is captured between the opposite ends of the slotted rails 28 and cannot be entirely removed from the bench seat 10 without removing at least one of the pegs 34 or 36. Other ramp sliding arrangements can be utilized to allow the pet ramp 20 to be moved under the seat cushion 12, and extended outwardly therefrom.

The first slotted rail 28 can be fastened between a front and back leg 14 of the bench seat 10, preferably on the inside surfaces of the legs 14. The second slotted rail can be attached to the opposite front and back legs 14 of the seat 12. Then, the decorative wood sides of the cushion support 18 can be overlaid on the slotted rails 28 so that the slotted rails 28 are hidden. Decorative side strips of the cushion support 18 can be applied to all four sides of the bench 10 as both a decorative cover, to hide the slotted rails 28, as well as to support the overlying cushion 12.

Figure 9:
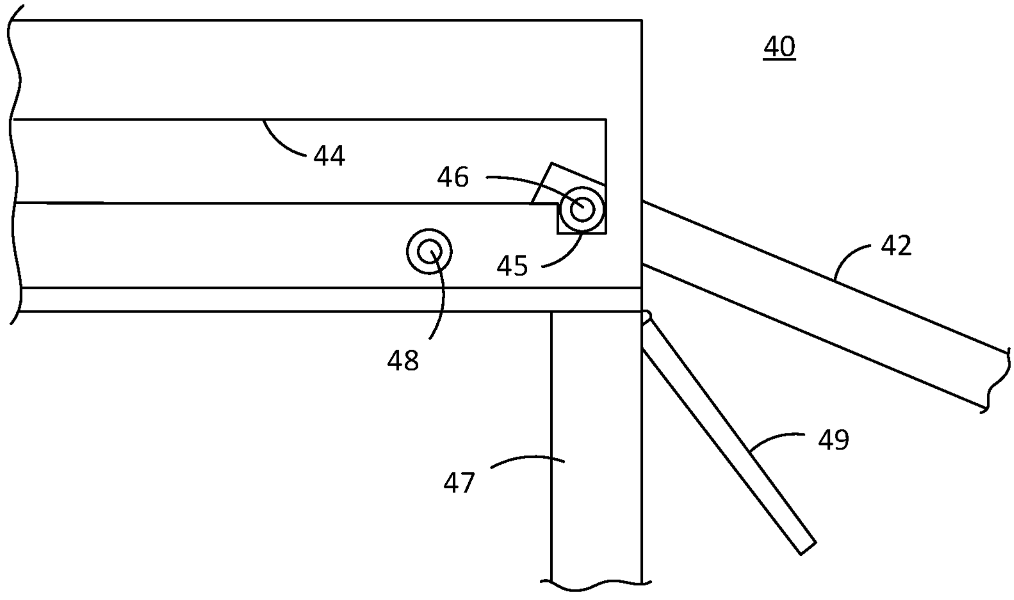
FIG. 9 is a partial side view of another embodiment of a bench seat according to the invention.

FIG. 9 illustrates another embodiment of the invention in which a pet bench 40 integrates therein a pet ramp 42. The bench seat 40 is illustrated without a top cushion. According to this embodiment, the ramp 42 slides in and out via a slot arrangement 44, much like the bench seat 10 of FIGS. 1-8. The slot 44 is closed at both ends to provide stops, and includes a downwardly directed depression 45 in which a ramp peg 46 drops when the ramp 42 is fully extended and rotated to form an incline. Here, the depression 45 is square for receiving therein at least a portion of the ramp peg 46. Much like the bench seat 10 described above, the bench seat 40 includes four legs, one shown as numeral 47. A cylindrical rod or tube 48 extends laterally across the bench seat 40 so that the outer part of the pet ramp 42 can rest thereon when fully inserted into the bench seat 40. Lastly, when the pet ramp 42 is hidden in the bench seat 40 under the top thereof, a hinged door 49 can be closed to hide the outer end of the pet ramp 42. The door 49 is hinged at the top portion thereof so that when opened, it is hidden under the pet ramp 42 when the latter is pulled outwardly to the inclined position. As with the other bench seat 10 described above, the bench seat 40 is also constructed so as to appear as ordinary household furniture.

FIGS. 10-13 illustrate another embodiment of the invention in which a typical household furniture, in the nature of a bench seat 50, incorporates a pet ramp that can also serve as a magazine or shoe rack 58. The bench seat 50 includes an upholstered cushion 52 supported by a peripheral cushion support 54, and four legs, one of which is identified by reference numeral 56. The cushion support 54 and the legs 56 constitute a frame of the bench seat 50. The cushion 52 of the bench seat 50 has a rigid base and rests on the cushion support 54 so as to be removable therefrom. The frame of the bench seat 50 is preferably constructed of finished wood, and the cushion is upholstered with a furniture type material.

Figure 10:
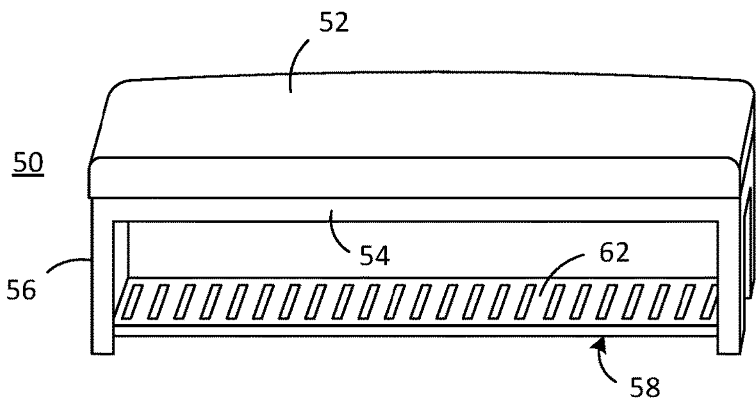
FIG. 10 is an isometric view of another embodiment of the invention in which a shoe rack can be removed from a position underlying the cushion of the bench seat, and employed as an inclined pet ramp.
Figure 11:
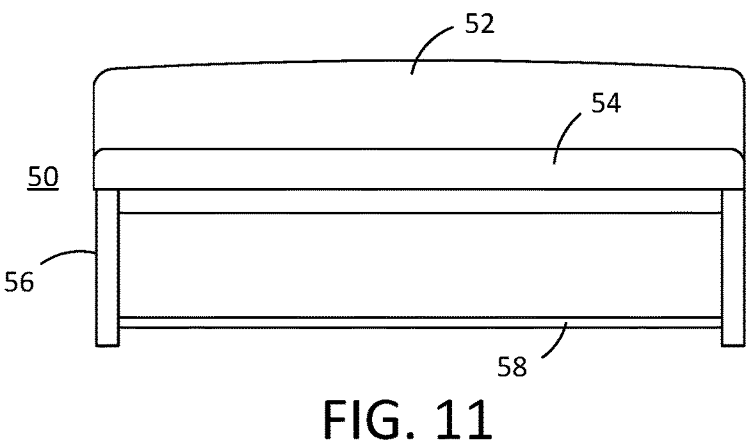
FIG. 11 is a side view of the bench seat of FIG. 10, with the shoe rack resting between the floor and the seat cushion.
Figure 13:
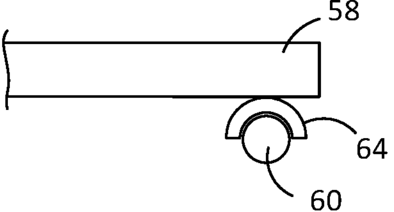
FIG. 13 is a partial side view of the outer end of the shoe rack equipped with an inverted U-shaped saddle.

The bench seat 50 includes a conventional appearing shoe or magazine rack 58 located and centered between the four legs 56. The shoe rack 58 is constructed of the same type of wood as the frame, and finished with the same color as the frame. The shoe rack 58 includes numerous spaced-apart cross slats 62. For purposes of illustration, the left-most set of legs 56 is considered the rear legs, and the right-most set of legs 56 is considered the front legs. A round cross bar or dowel rod (not shown) extends and is fixed between the rear set of legs to provide lateral support thereto. Similarly, a round cross bar 60 (FIG. 13) extends between the two front legs 56 to provide lateral support thereto. The back or rear end of the shoe rack 58 rests on the rear cross bar, and the front end of the shoe rack 58 rests on the front cross bar 60 by utilizing a pair of inverted U-shaped saddles 64, one of which is illustrated in FIG. 13. The saddles 64 are constructed of metal or plastic and are fastened to the underside of the front end of the shoe rack 58. The size of the inverted U-shaped saddles 64 is such that they fit snugly around the round cross bar 60. With this arrangement, the shoe rack 58 cannot be moved back and forth with respect to the legs 56. When utilized as a shoe rack 58, it rests on the rear and front cross pieces 60, and appears as a typical shoe rack or magazine rack used with conventional household furniture, as illustrated in FIG. 10.

Figure 12:
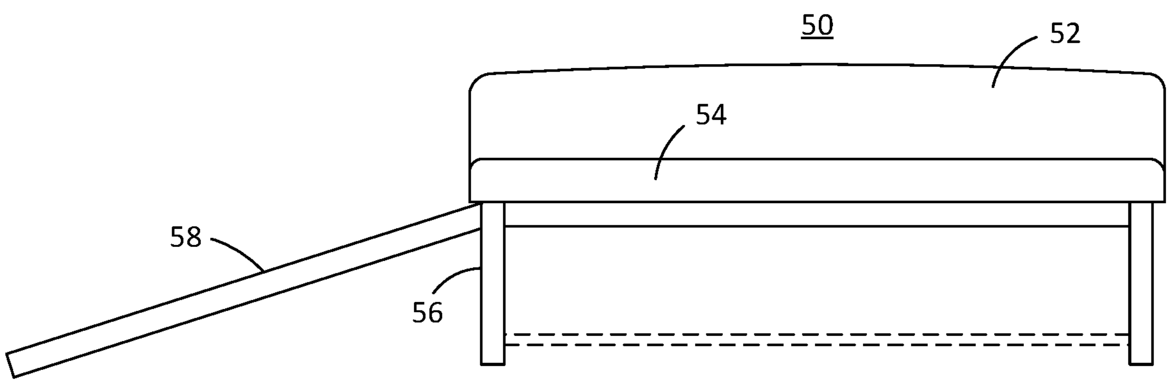
FIG. 12 is a side view of the bench seat of FIG. 11 with the shoe rack removed from the shoe rack position and placed as an incline between the floor and an edge of the bench seat.

As illustrated in FIG. 12, the shoe rack 58 can be removed from the bench seat 50 by lifting up on the front end thereof to disengage the inverted U-shaped saddles 64 from the frontal cross bar 60 and moving the shoe rack 58 out of the bench seat 50 to the rear. The width of the magazine rack 58 is narrower than the distance between the two rear legs 56 and the distance between the two front legs 56. When removed, the shoe rack 58 can then be utilized as a pet ramp 58, as described below. When completely removed from the bench seat 50, from front to back, or vice versa, the frontal end of the pet ramp 58 is manually raised, and the rear end of the cushion 52 is raised to expose a third tubular cross bar (not shown) that is fastened between the rear-most part of the cushion support 54. The inverted U-shaped saddle members 64 of the ramp are then lowered onto the third tubular cross bar and captured thereon, thus preventing back and forth movement of the pet ramp 58. With the left-most end of the pet ramp 58 resting on the floor, and the right-most end of the pet ramp 58 engaged with the third tubular cross bar, an inclined structure is provided. A pet can thus easily move from the floor to the pet ramp 58 and thus to a bed, couch, etc., and vice versa. The cross slats 62 of the pet ramp 58 prevent a pet from slipping thereon and assure safe movement of the pet on the ramp 58. As can be appreciated, and in accordance with an important feature of the invention, the magazine rack 58 can be easily converted to a pet ramp 58. This is an efficient use of the components of the bench seat 50.

After use, the pet ramp 58 can be stowed away under the seat cushion 52 and used again as a shoe or magazine rack 58. This is accomplished by lifting the rear end of the cushion 52, and lifting upwardly on the frontal end of the pet ramp 58 to disengage the inverted U-shaped saddles 64 from the associated third tubular cross bar. The pet ramp 58 can be entirely removed from the bench seat 50 and moved between the four legs 56 of the bench seat 50 to the stowed position illustrated in FIG. 10. Here, the pet ramp 58 can again function as a shoe or magazine rack 58.

In view of the construction of the household furniture of FIGS. 10-13, the magazine rack 58 can be converted to a pet ramp 58 to allow a pet to ascend from the floor to a bed or the like. Conversely, when it is no longer desired to utilize the furniture as a pet ramp, it can be converted back to a magazine rack. The versatility of the household furniture according to the invention is apparent.

From the foregoing, it can be seen that the household furniture incorporates therein a ramp that allows pets to more easily walk up the ramp and rest on furniture, as well as walk down the ramp back to the floor, all without jumping. Many pets, such as old pets, find it difficult to jump onto furniture because of the height thereof. In addition, the leg joints of many pets can be injured when they jump off couches, chairs, beds, etc. The bench seat of the invention overcomes these problems while yet maintaining the look of ordinary furniture for the bench/ramp.

While the preferred and other embodiments of the invention have been disclosed with reference to specific bench seat components and configurations, and associated methods of fabrication thereof, it is to be understood that many changes in detail may be made as a matter of engineering and design choices without departing from the spirit and scope of the invention, as defined by the appended claims.

What is claimed is:

1. An item of household furniture, comprising:

a bench seat that includes four legs and a cushion support supported by said legs;

a cushion supported by said cushion support, said cushion for sitting on by a user thereof;

a ramp that is constructed so as to be overall rigid, and said ramp is extendable from a hidden position under said cushion to a position extended from one side of said bench seat, said ramp having a top surface on which a pet can move;

an edge of said ramp accessible for grasping to extend said ramp outwardly from under said cushion;

said ramp is pivotally mounted at one side thereof to said bench seat so that when said ramp is pivoted until an opposite side of said ramp engages with a floor, said ramp provides an inclined surface; and whereby when said top surface of said ramp is hidden under said bench seat, said bench seat appears as conventional household furniture.

2. The item of household furniture of claim 1, wherein said ramp top surface is planar and slideable from the hidden position under the cushion.

3. The item of household furniture of claim 1, wherein said bench seat is constructed with opposing spaced-apart slotted rails, and said ramp includes opposing spaced-apart pegs, where each said peg is adapted for sliding in a respective slot of one said rail.

4. The item of household furniture of claim 3, wherein each slot of said slotted rails includes a stop at opposing ends thereof so that said pegs are adapted for abutting against respective said slots at extreme endpoints of ramp movement.

5. The item of household furniture of claim 1, wherein said cushion support, said legs and said ramp are all constructed of wood and stained to provide a furniture appearance.

6. The item of household furniture of claim 5, wherein said bench seat is upholstered with a soft cushion.

7. The item of household furniture of claim 1, further including a handle attached to said edge of said ramp for grasping and moving said ramp with respect to said bench seat.

8. The item of household furniture of claim 1, wherein said ramp further includes a first leg and a second leg, each of said first leg and said second leg pivotally mounted adjacent to the edge of said ramp that is opposite said one side of the ramp adjacent to said bench seat, each said leg of said first leg and said second leg being pivotal from a position under said ramp and parallel to said ramp, to a position substantially perpendicular to said ramp, and each said leg of said first and second legs having a length so that when said furniture rests on the floor, said ramp is substantially parallel to said floor, and said ramp effectively enlarges a top surface of said bench seat.

9. The item of household furniture of claim 8, when said ramp is extended from said bench seat, said first and second legs can be folded and pivoted to the position under said ramp and the edge of said ramp can pivot to rest on the floor, and said ramp provides an inclined surface.

10. An item of household furniture, comprising:

an upholstered seat covered with a fabric including one of cloth, vinyl or leather;

a seat support constructed of wood for supporting an outer periphery of said upholstered seat, said wood seat support having four sides, each said seat support side stained with a suitable color to provide a household furniture appearance;

four wooden legs supporting said wood seat support, said four wooden legs stained to match the stain of said wood seat support;

a pet ramp constructed of wood and stained with said suitable color to match that of said wood seat support and said wood legs, said pet ramp slideable horizontally from a position under said upholstered seat and generally hidden from view, to a position extended from one side of said wood seat support;

an edge of said pet ramp accessible for grasping to extend said pet ramp outwardly from under said upholstered seat; and said pet ramp pivotally mounted to said wood seat support so that the edge thereof can be pivoted downwardly and rest on a floor, whereby said pet ramp is inclined with respect to said wood seat support.

11. The item of household furniture of claim 10, wherein said pet ramp is hidden from view under said upholstered seat except for said edge.

12. The item of household furniture of claim 11, wherein said edge of said pet ramp includes a handle for pulling said pet ramp from the hidden position to said extended position.

13. The item of household furniture of claim 10, wherein said pet ramp includes pegs on opposite sides thereof, and said wood seat support includes a slide arrangement, said slide arrangement including a respective slot in opposite sides of said wood seat support for receiving therein a respective said pet ramp peg, whereby said pet ramp can be moved from said hidden position to said extended position using said pegs sliding in said respective wood seat support slots.

14. The item of household furniture of claim 13, wherein each said wood seat support slot is elongated and includes respective first stops at one end thereof, and including second stops located at an opposite end of said wood seat support from which said pet ramp extends, said slots adjacent to said second stops each include a downwardly depending depression into which a respective said peg drops when said pet ramp is in the extended position, whereby said pet ramp is prevented from being moved from said extended position to said hidden position until said ramp is raised to remove said pegs from the respective depressions.

15. The item of household furniture of claim 10, wherein said pet ramp further includes a pair of legs pivotally located at an outer part thereof so that when said pet ramp is moved to the extended position, said pair of legs can be pivoted downwardly to support said pet ramp in a horizontal position, whereby said upholstered seat forms a first seat, and said horizontal pet ramp forms a second seat.

16. The item of household furniture of claim 10, wherein said seat support further includes a side opening through which said pet ramp moves from a position under the upholstered seat outwardly to an inclined position, and further including a door hinged to a closed position to hide said side opening.

* * * * *